(12) United States Patent
Hopper et al.

(10) Patent No.: US 6,278,065 B1
(45) Date of Patent: Aug. 21, 2001

(54) APPARATUS AND METHOD FOR MINIMIZING CURRENTS IN ELECTRICAL DEVICES

(75) Inventors: Ann Hopper; Brendan Harmon, both of Dundalk (IE)

(73) Assignee: Harris Ireland Development Company, Ltd., The Demesne Dundalk (IL)

(*) Notice: Subject to any disclaimer, the term of this patent is extended or adjusted under 35 U.S.C. 154(b) by 0 days.

(21) Appl. No.: 09/360,170

(22) Filed: Jul. 26, 1999

Related U.S. Application Data

(60) Provisional application No. 60/127,612, filed on Apr. 1, 1999.

(51) Int. Cl.[7] .................................................. H01B 17/00
(52) U.S. Cl. ........................ 174/139; 429/825; 257/703
(58) Field of Search .......................... 427/123; 429/825; 361/736, 809; 174/52.1, 139; 257/703

(56) References Cited

U.S. PATENT DOCUMENTS

| | | | | |
|---|---|---|---|---|
| 3,735,211 | * | 5/1973 | Kapnias | 257/729 |
| 4,445,274 | * | 5/1984 | Suzuki et al. | 29/832 |
| 4,604,677 | * | 8/1986 | Suzuki et al. | 174/52.1 |
| 4,871,583 | * | 10/1989 | Monnier | 427/96 |

* cited by examiner

Primary Examiner—Shawn Riley
(74) Attorney, Agent, or Firm—Carter, Ledyard & Milburn

(57) ABSTRACT

A method for minimizing leakage currents in electrical devices with ceramic bodies. An electrical device that includes a ceramic body with electrically conductive terminations and is provided with a protective sealant to prevent flux penetration during the subsequent soldering of the device into an electrical circuit. The method includes coating the device in a fluorinated polymer which inhibits flux penetration of the ceramic body during soldering of the terminals without interfering with the soldering process.

36 Claims, 2 Drawing Sheets

APPARATUS AND METHOD FOR MINIMIZING CURRENTS IN ELECTRICAL DEVICES

CROSS REFERENCE TO RELATED APPLICATIONS

This application is related to and claims priority from U.S. Provisional Application Serial No. 60/127,612 entitled "APPARATUS AND METHOD FOR MINIMIZING CURRENTS IN DISCRETE ELECTRICAL DEVICES" filed Apr. 1, 1999.

BACKGROUND OF THE INVENTION

The present invention relates to semiconductor devices with discrete surface mount components such as capacitors, varistors and resistors. More particularly the invention relates to methods of preventing current leakage problems resulting from flux penetration of a device with a ceramic body.

Resistive devices are known in the art, and are described, for example, in U.S. Pat. No. 5,115,221 issued to Cowman on May 19, 1992, and incorporated by reference herein. With reference to FIG. 1, a typical device 10 may include plural layers 12 of a ceramic semiconductor material with electrically conductive electrodes 14 between adjacent layers. A portion of each electrode 14 is exposed in a terminal region 16 so that electrical contact may be made therewith. The electrodes 14 may be exposed at one or both of opposing terminal regions, and typically the electrodes are exposed at alternating terminal regions 16 as illustrated. The exposed portions of the electrodes 14 are contacted by electrically conductive end terminals 18 that cover the terminal regions 16.

Preferably, the terminal regions 16 may be plated with nickel and tin/tin-lead metals to increase solderability and decrease solder leaching. The end terminals 18 may be affixed using a conventional barrel plating method or dipping process. In addition, a rotating drum process may be used. The plating process may create imperfections in the ceramic body creating problems with subsequent performance.

Following installation into an electrical circuit, electrical devices with ceramic bodies have experienced less than desired performance characteristics as a result of current leakage between the end terminals 18. The leakage current flows between the terminals 18 along the surface of the ceramic 12. The leakage current may be enhanced by the interaction between flux from the soldering process and etching or grooves in the surface of the ceramic body 12. The grooves typically develop during the fabrication of the device. For example, during the plating of the metal terminations 18, the surface of the ceramic 12 may become etched with grooves. When the device is installed into an electrical circuit by soldering the terminals, flux from the soldering process may flow into these grooves on the ceramic body creating a flow path for current between the terminals 18 along the surface of the device.

It is known to provide coatings for electrical devices with ceramic bodies. For example, U.S. Pat. No. 5,614,074 issued to Ravindranathan on Mar. 25, 1997, discloses reacting a semiconductor body with phosphoric acid to selectively form a phosphate layer on the body. The electrically insulative phosphate layer is formed prior to the plating process to inhibit formation of conductive terminals other than at the ends of the device. The phosphate layer may be substantially removed during the plating process. However, in some processes the phosphate layer may remain after the plating process is complete. The passivation process used to form the phosphate layer may further etch the surface of the ceramic body. As a result, the phosphate layer does not inhibit subsequent current leakage between the terminals 18.

Accordingly, it is an object of the present invention to provide a novel method that minimizes current leakage between terminals of an electrical device with a ceramic body.

It is another object of the present invention to provide a novel electrical device with a protective layer to minimize flux penetration of the ceramic surface of the device.

It is yet another object of the present invention to provide a novel method of manufacturing an electrical device with a ceramic body that includes a protective layer to minimize flux penetration of the exposed ceramic.

It is still another object of the present invention to provide a novel electrical device with a flux resistant sealer that does not inhibit soldering.

It is a further object of the present invention to provide a novel method of manufacturing an electrical device that includes providing a flux resistant sealer that does not inhibit soldering.

It is yet a further object of the present invention to provide a novel electrical device with a flux resistant sealer that may be applied to the entire device including the terminals.

It is still a further object of the present invention to provide a novel method of manufacturing an electrical device that includes applying a protective sealant to the entire device including the terminals.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
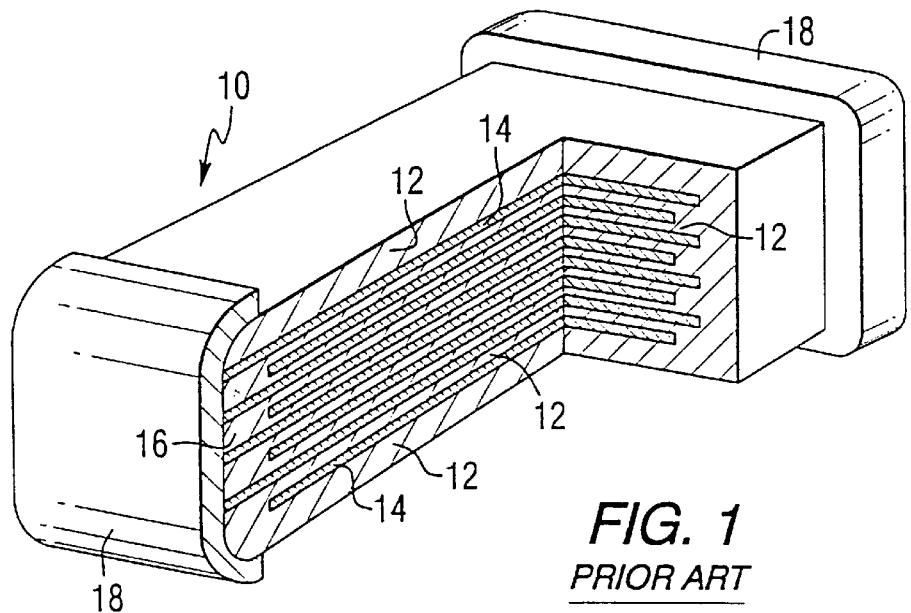
FIG. 1 is a pictorial depiction of an electrical device typical of the prior art.
Figure 2:
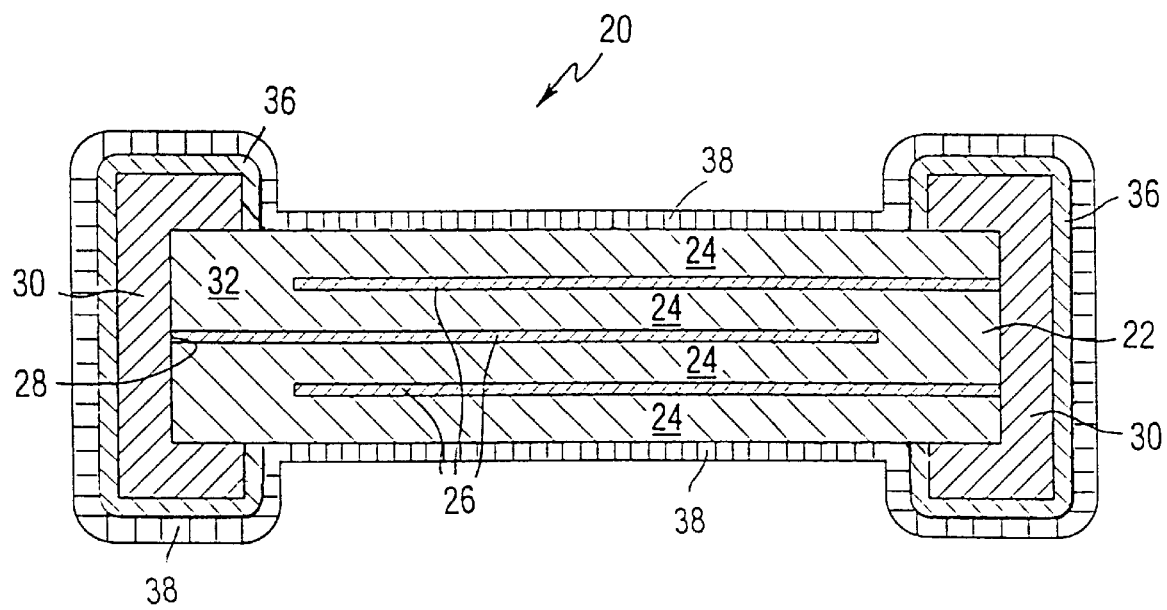
FIG. 2 is vertical cross section of an embodiment of the device of the present invention.

With reference to FIG. 2, an embodiment of a nonlinear resistive element 20 may include a body 22 having stacked semiconductor layers 24 with generally planar electrodes 26 between adjacent pairs of the semiconductor layers 24. Each electrode 26 may have a contactable portion 28 that is exposed for electrical connection to the electrically conductive metal (preferably silver, silver-platinum, or silver-palladium) end terminations 30 that cover the terminal regions 32 of the body 22 and contact the electrodes 26. The end terminations 30 may be plated with layers 36 of electrically conductive metal that form electrically contactable end portions for the resistive element 20.

The device body 22 and the end terminations 30 may be provided conventionally. The body 22 may comprise zinc oxide (or a ceramic including principally zinc oxide) and semiconductor layers 24. Alternatively, the body 22 may comprise iron oxide, or a ferrite, etc with a ceramic exterior. The semiconductor layers 24 may comprise a metal oxide such as zinc oxide or iron oxide. By way of example, in one embodiment the zinc oxide semiconductor layers 24 may have the following composition in mole percent: 94–98% zinc oxide and 2–6% of one or more of the following additives; bismuth oxide, cobalt oxide, manganese oxide, nickel oxide, antimony oxide, boric oxide, chromium oxide, silicon oxide, aluminum nitrate, and other equivalents.

The device 20 may further include a layer of flux resistant sealant or coating 38. The layer 38 may comprise a fluorinated polymer. Preferably the sealant 38 comprises FLUO-RAD™ Fluorochemical Coating a polymer available from Minnesota, Mining and Manufacturing Company (3M). FLUORAD™ is a clear mobile solution of fluoroaliphatic copolymer typically used for electronic circuit boards. The ingredients of the FLUORAD™ coating include 98% perfluoro compounds (primary compounds with 6 carbons) and 2% fluoroaliphatic copolymer. The layer 38 may be applied by spraying, dipping into solution and applying a ultrasonic waves, brushing, spin coating or transfer printing. Preferably the sealant 38 is applied to a thickness of approximately 1 $\mu$m across the surface of the device.

In a typical process, the device is dipped into a plating barrel or ultrasonic tank. After allowing time for the reaction, typically 2–15 minutes, the device is removed and dried using an air knife. The process may further include cooling coils to minimize loss of the solution and encourage layer formation. The process preferably includes a solution of 0.5–4% of the fluoraliphatic copolymer in a perfluor compound or a hydrofluoroether compound solute.

The reaction preferably is conducted at an operating temperature of 20° C. to 30° C. The time required for the reaction is dependent on the thickness of the layer required. The operating conditions of the reaction may be modified within the specified ranges to accommodate different semiconducting device designs.

During subsequent soldering of the terminals 36, the sealant layer 38 is removed from the terminals 36. As a result, the sealant layer does not impede the soldering process. Sufficient sealant 38 remains overlying the ceramic body 22 to inhibit flux penetration of the ceramic.

Figure 5:
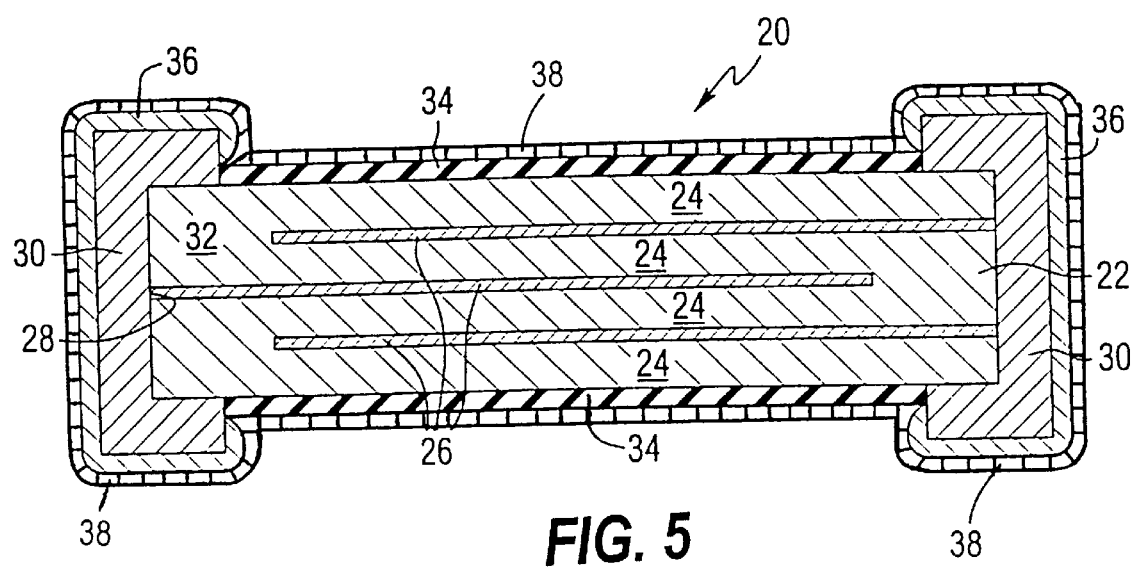
FIG. 5 is an alternative embodiment of the device that includes a phosphate layer and a flux resistant layer.

FIG. 5, discloses an alternative embodiment of the present invention in which, in addition to the flux sealant, the portions of the body 22 not covered with the end terminations 30 may be coated with an electrically insulative zinc phosphate layer 34. The phosphate layer 34 is applied prior to plating the device with an electrically conductive metal to provide the layers 36. The layer of flux sealer 38 may be applied over the phosphate layer 34.

The phosphate layer 34, may be deposited on the device body 22 by a passivation process. The process includes reacting a phosphoric acid solution with the metal oxide semiconductor layers 24 exposed at the exterior of the body 22. The device body 22 is saturated in the phosphoric acid solution to thereby form the phosphate layer 34 by deposition of phosphate in the acid solution onto the exposed semiconductor layers 24.

The phosphoric acid solution may comprise phosphoric acid, zinc oxide or a zinc salt, and a pH modifier such as ammonia. Zinc phosphate forms in the solution and deposits onto the exposed surface of the zinc oxide semiconductor layer 24 during the passivation process. In an alternative embodiment, a phosphoric acid solution without zinc oxide or ammonia is used causing the Zinc phosphate layer to form directly on the body 22.

The phosphoric acid solution desirably has a pH of 2 to 4 but the pH of solution may be 1 to 5. The reaction may take place for 10 to 50 minutes at an operating temperature of 15° C. to 70° C. The time required for the reaction is dependent on the thickness of the layer required for the specific temperature and pH conditions of the reaction. The operating conditions of the reaction may also be modified within the specified ranges to accommodate different semiconducting device designs.

By way of example, one part phosphoric acid (85%) may be added to one hundred parts deionized water. The pH of the solution is modified to 2 and the solution is heated to a temperature above 30° C. The body 22 with end terminations 30 affixed may be washed with acetone and dried at about 100° C. for ten minutes. The washed device may be submerged in the phosphoric acid solution for thirty minutes to provide the layer 34. After the layer 34 is applied, the body may be cleaned with deionized water and dried at about 100° C. for about fifteen minutes. The layer 34 does not adhere to the end terminations 30 because the silver or silver-platinum in the end terminations 30 is not affected by the phosphoric acid. The phosphoric acid solution may also be applied by spraying, instead of submerging, the device.

After the zinc phosphate layer 34 has been applied, the device may be plated with an electrically conductive metal, such as nickel and tin/tin-lead, to provide the layers 36. A conventional barrel plating process may be used, although the pH of the plating solution is desirably kept between about 4.0 and 6.0. In the barrel plating process the device is made electrically conductive and the plating material adheres to the electrically charged portions of the device. The metal plating of layers 36 does not plate the zinc phosphate layer 34 during the barrel plating because the zinc phosphate is not electrically conductive.

Following the plating process, the layer of fluorinated polymer may be deposited over the phosphate layer by any of the above described methods. The phosphate layer and the fluorinated polymer layer do not substantially effect the current and volatage characteristics of the device. In an alternative embodiment the phosphate layer is removed during the plating process and the fluorinated polymer is formed directly on the ceramic body.

In an alternative embodiment, the phosphate layer may be an inorganic oxide layer formed by the reaction of phosphoric acid with the metal oxide semiconductor in the device. For example, instead of zinc oxide, the semiconductor may be iron oxide, a ferrite, etc.

Figure 3:
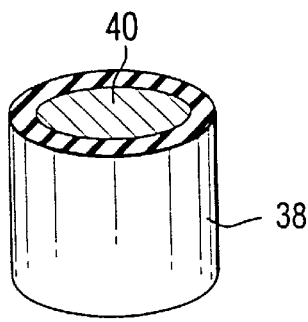
FIG. 3 is a pictorial depiction of a high energy disc varistor with flux resistant coating.
Figure 4:
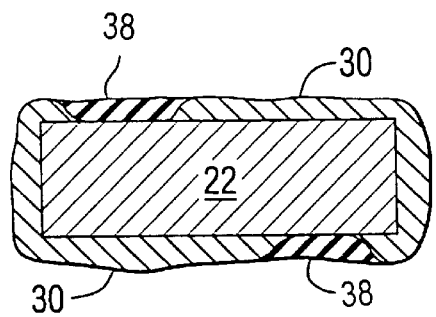
FIG. 4 is a pictorial depiction of a surface mount device with flux resistant layer.

In another alternative embodiment, the method described above may be used in the manufacture of other types of electronic devices. For example, a high energy disc varistor may be similarly sealed. With reference to FIG. 3, the disc varistor 40 may include the flux sealer 38 formed in the manner discussed above. The present invention is applicable to other varistor products such as a surface mount device depicted in FIG. 4, radial parts, arrays, connector pins, discoidal construction, etc.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In an electrical device having a ceramic body and terminals capable of being soldered to leads of an electrical circuit, the improvement comprising a flux resistant coating which does not materially inhibit the subsequent soldering of the lead to the terminal and reduces the penetration of flux into the ceramic during the soldering thereby reducing the magnitude of the leakage current between the terminals adjacent to the surface of the ceramic body which results from the use of flux in the soldering.

2. A semiconductor device with improved current leakage characteristics between terminals comprising:

a body with a ceramic exterior;

a pair of conductive terminals mounted to said body and exposed for connection by soldering to an electrical circuit;

a protective sealant overlying at least said body and reducing flux penetration of the ceramic in a subsequent soldering of said terminals to the external circuit to thereby reduce leakage current along said ceramic exterior between said terminals.

3. The device of claim 2, wherein the sealant comprises a fluorinated polymer.

4. The device of claim 2, wherein said terminals are mounted on said body by a dipping process.

5. The device of claim 2, wherein said terminals are mounted on said body by a plating process.

6. The device of claim 2, wherein the device is a resistor.

7. The device of claim 2, wherein the device is a varistor.

8. The device of claim 2, further comprising a phosphate layer overlying the ceramic body and underlying the protective sealant.

9. The device of claim 2, wherein the device is a capacitor.

10. The device of claim 2, wherein said sealant overlies said terminals as well as said body.

11. The device of claim 10 wherein said sealant does not impede soldering.

12. A method of fabricating an electrical device capable of being installed in an electrical circuit in a soldering process comprising the steps of:

(a) providing a body having a ceramic exterior; and (b) covering the ceramic exterior with a sealant resistant to flux penetration.

13. The method of claim 12 further comprising the step of attaching a pair of electrically conductive metal terminals to the body so that the terminals are separated by the ceramic exterior.

14. The method of claim 13, wherein the attaching step comprises a rotating drum.

15. The method of claim 12, wherein the step of covering the ceramic exterior includes comprises spraying the body with the sealant.

16. The method of claim 12, wherein the step of covering the ceramic exterior comprises dipping the body into the sealant.

17. The method of claim 12, wherein the step of covering the ceramic exterior comprises immersing the body into the sealant and transmitting ultrasonic waves.

18. The method of claim 12, wherein the step of covering the ceramic exterior comprises brushing the sealant onto the body.

19. The method of claim 12, wherein the step of covering the ceramic exterior comprises spin coating the body with the sealant.

20. The method of claim 12, wherein the step of covering the ceramic exterior comprises transfer printing the sealant onto the body.

21. The method of claim 12, wherein covering the ceramic exterior with the sealant does not impede soldering electrical device into an electrical circuit.

22. The method of claim 12, wherein the sealant comprises a fluorinated polymer.

23. The method of claim 12, further comprising the step of coating the ceramic body with a phosphate layer prior to the step of covering the body with the sealant.

24. In a method of manufacturing a semiconductor device with a ceramic body having a pair of spaced apart electrically conductive terminals capable of being soldered for electrical connection to an electrical circuit, the improvement comprising the step of coating the device with a sealant that reduces flux penetration of the body during subsequent soldering of the terminals.

25. In a method of manufacturing an electrical device with a ceramic body, the improvement comprising the step of applying a flux resistant coating to reduce penetration of the ceramic by flux in a subsequent soldering process.

26. A method of reducing leakage currents along the surface of an electrical device between terminals resulting from flux used in soldering process, comprising the steps of:

(a) providing a body for the device, the exterior of the body being a metal oxide semiconductor material;

(b) attaching a pair of conductive terminals to the body for attachment to the electrical circuit; and (c) covering the exposed portions of the semiconductor material with a flux sealer.

27. The method of claim 26, wherein the step of covering the semiconductor material comprises spraying the flux sealer on the exposed portions of semiconductor material.

28. The method of claim 26, wherein the step of covering the semiconductor material comprises dipping the body into the flux sealer.

29. The method of claim 26, wherein the step of covering the semiconductor material comprises immersing the body into the flux sealer and exposing the body to ultrasonic waves.

30. The method of claim 26, wherein the step of covering the semiconductor material comprises brushing the flux sealer onto the exposed portions of semiconductor material.

31. The method of claim 26, wherein the step of covering the semiconductor material comprises spin coating the flux sealer on the exposed portions of semiconductor material.

32. The method of claim 26, wherein the step of covering the semiconductor material comprises transfer printing the flux sealer onto the exposed portions of semiconductor material.

33. The method of claim 26 wherein the flux sealer is a fluorinated polymer.

34. The method of claim 26 further comprising the step of coating the body with a phosphate layer prior to attaching the terminals.

35. The method of claim 26 wherein the flux sealer covers the conductive terminals.

36. The device of claim 2 wherein the protective sealant includes a fluoroaliphatic copolymer.

* * * * *